United States Patent [19]

Matthews et al.

[11] Patent Number: 4,930,824
[45] Date of Patent: Jun. 5, 1990

[54] GUTTER CLEANER

[75] Inventors: Thomas R. Matthews; Garland B. Ricketts, both of South Boston, Va.

[73] Assignee: Mercantile Enterprises, Inc., Halifax, Va.

[21] Appl. No.: 345,349

[22] Filed: Apr. 28, 1989

[51] Int. Cl.⁵ .................... B25J 1/00; E04D 13/06
[52] U.S. Cl. ..................... 294/19.1; 15/236.04
[58] Field of Search ............ 294/1.1, 19.1, 22, 23, 294/50.8, 50.9, 100; 15/104.3 G, 236 R, 236.04; 56/333, 334, 337, 400.12, 400.16, 400.21

[56] References Cited

U.S. PATENT DOCUMENTS

| | | | |
|---|---|---|---|
| 1,939,475 | 12/1933 | Walsh | 294/50.9 |
| 2,720,409 | 10/1955 | Griffith | 294/19.1 |
| 3,264,809 | 8/1966 | Jackson | 56/400.12 |
| 3,346,293 | 10/1967 | Wilcox | 294/19 |
| 3,601,835 | 8/1971 | Morgan | 15/105 |
| 3,601,966 | 8/1971 | Kerry | 56/400.12 |
| 3,626,542 | 12/1971 | Despain et al. | 15/236 |
| 3,937,512 | 2/1976 | Baughman | 294/19.1 |
| 3,972,552 | 8/1976 | Earp, Jr. | 294/19.1 |
| 4,057,276 | 11/1977 | Currie | 294/19.1 |
| 4,114,938 | 9/1978 | Strader | 294/19.1 |
| 4,143,899 | 3/1979 | Wetherall et al. | 294/50.9 |
| 4,378,671 | 4/1983 | Gascon | 56/400.12 |
| 4,615,555 | 10/1986 | Bateham | 294/19.1 |
| 4,753,473 | 6/1988 | Arnett | 294/19.1 X |

Primary Examiner—Johnny D. Cherry
Attorney, Agent, or Firm—Richard E. Jenkins

[57] ABSTRACT

A gutter cleaner for remotely cleaning an overhead gutter or the like which includes an elongate handle, a pair of cooperating fork-like jaws mounted at the upper end of the handle, and a sleeve slidably mounted on the lower end of the handle for selectively opening and closing the fork-like jaws. The jaws include a stationary first jaw and a relatively pivotably movable second jaw which each have a greater width than height so that the jaws may be placed in a gutter extending in a direction lengthwise with the gutter. In this manner a substantial length of the gutter may be cleaned of collected debris with each application of the gutter cleaner thereto.

8 Claims, 3 Drawing Sheets

GUTTER CLEANER

TECHNICAL FIELD

The present invention relates to an apparatus for remotely removing accumulated leaves or other debris from an overhead gutter of a building or the like, and more particularly to an improved hand-held apparatus for use by an individual at ground level to easily and efficiently clean leaves or other debris from overhead gutters of a home.

BACKGROUND ART

It is well known to homeowners that the gutters of their home must be periodically cleaned in order to prevent them from becoming clogged with leaves and other debris which has collected therein. Failure to properly clean gutters inevitably results in improper waterflow to the ground during rainfall and the ultimate deterioration of the gutters and eaves.

In the past, it has been common for homeowners to clean the gutters by climbing a ladder and removing the debris by hand. This requires either that the individual perform the dangerous task of crawling around the perimeter of the house to clean the entire gutter system or, perhaps even worse, continually returning to the ground and shifting the ladder laterally about 3 to 4 feet and then again climbing the ladder to remove the debris from the gutter. The first technique is potentially dangerous to the homeowner and the second technique, while not quite as dangerous, is even more laborious.

In an effort to render gutter cleaning a less undesirable homeowner's chore, various devices have heretofore been proposed for reaching into an overhead gutter while standing on the ground and removing leaves and other debris from the gutter. For example, the patent to Earp, Jr., U.S. Pat. No. 3,972,276, discloses a gutter cleaner comprising a telescopic handle and including a pair of arms with tines at the end thereof which are adapted to move lengthwise along the gutter and towards each other when a control rope is pulled to urge the arms together. Also of interest, the patent to Griffith, U.S. Pat. No. 2,720,409, shows an eave gutter cleaning device comprising an extensible handle having a pair of pivotably mounted tong elements at the end thereof which may be opened and closed about gutter debris by means of a pull cord which extends from the tongs to a trigger at the lower end of the handle. This device, as well as the Earp, Jr. gutter cleaner, provides for movement of the pivotably mounted tongs into open and closed positions along a pathway which extends generally parallel to the longitudinal axis of the gutter. This movement possesses inherent deficiencies since the tongs are periodically obstructed by the gutter supports and the cleaning action of the tongs over downspouts at gutter ends is restricted. Moreover, although a "trigger" is used to actuate the cord extending to the tongs, the Griffith device does not really provide a convenient and practical actuation means for the tongs any more than does the Earp, Jr. gutter cleaner which requires that the handle be held in one hand while the cord is pulled with the other in order to open and close the debris-collecting arms thereof.

DISCLOSURE OF THE INVENTION

In accordance with the present invention, applicant provides an improved gutter cleaner which overcomes the aforementioned deficiencies of prior art devices and is designed specifically to collect a relatively large amount of gutter debris with each use as well as to provide a jaw actuation mechanism which allows the operator to maintain both hands on the handle of the device. The gutter cleaner comprises an elongate handle having one end adapted to be held by the user and a remote end adapted to reach adjacent overhead gutters which has a pair of co-operating fork-like jaws mounted thereon. Each of the pair of jaws has a greater width than height, and the pair of jaws include a stationary first jaw which is adapted to be positioned in an overhead gutter parallel to the longitudinal axis of the gutter, and a relatively pivotably movable second jaw extending lengthwise parallel to and substantially coextensive with the first jaw. The second jaw is adapted to pivot toward and away from the first jaw into closed and open positions, respectively, and means are provided for biasing the pair of jaws outwardly relative to each other into their open position. Finally, actuation means are provided which are operable from the user end of the elongate handle for selectively moving the jaws into their open and closed positions.

It is therefore the object of the present invention to provide a gutter cleaner which is able to easily and efficiently remove leaves and other debris from an overhead gutter and is particularly efficient over a downspout adjacent the end of a gutter.

It is another object of the present invention to provide a gutter cleaner which collects debris from a relatively long length of the gutter during each closure of the jaws thereof.

It is still another object of the present invention to provide a gutter cleaner having an easy-to-use actuation means for operating the fork-like jaws which allows the operator to maintain both hands firmly on the handle during use of the gutter cleaner.

It is also an object of the present invention to provide a gutter cleaner of the described type wherein the jaws are aligned in their lengthwise direction with the longitudinal axis of the gutter and one jaw moves relative to the other stationary jaw along a pathway extending perpendicular to the longitudinal gutter axis.

DESCRIPTION OF THE DRAWINGS

Some of the objects of the invention having been stated, other objects will appear as the description proceeds, when taken in connection with the accompanying drawings, in which.

BEST MODE FOR CARRYING OUT THE INVENTION

Figure 1:
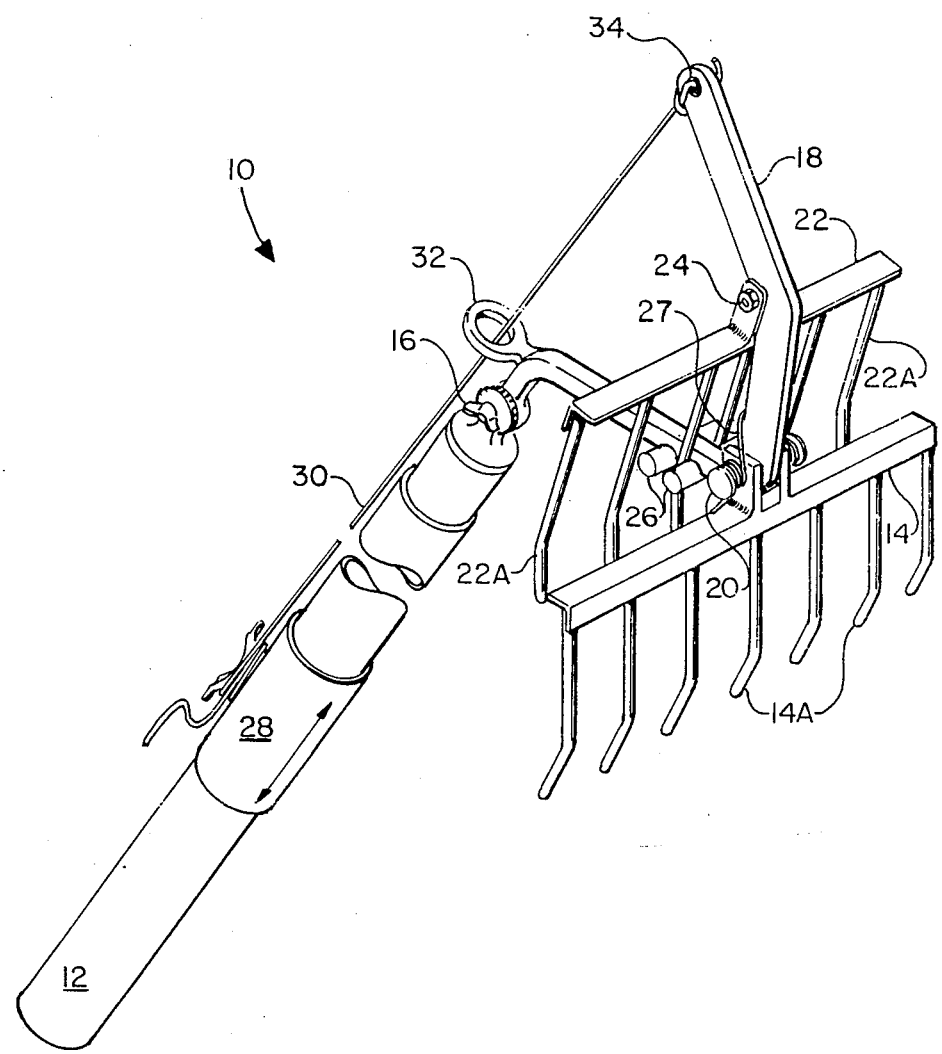
FIG. 1 is a perspective view of the gutter cleaner of the present invention.
Figure 2:
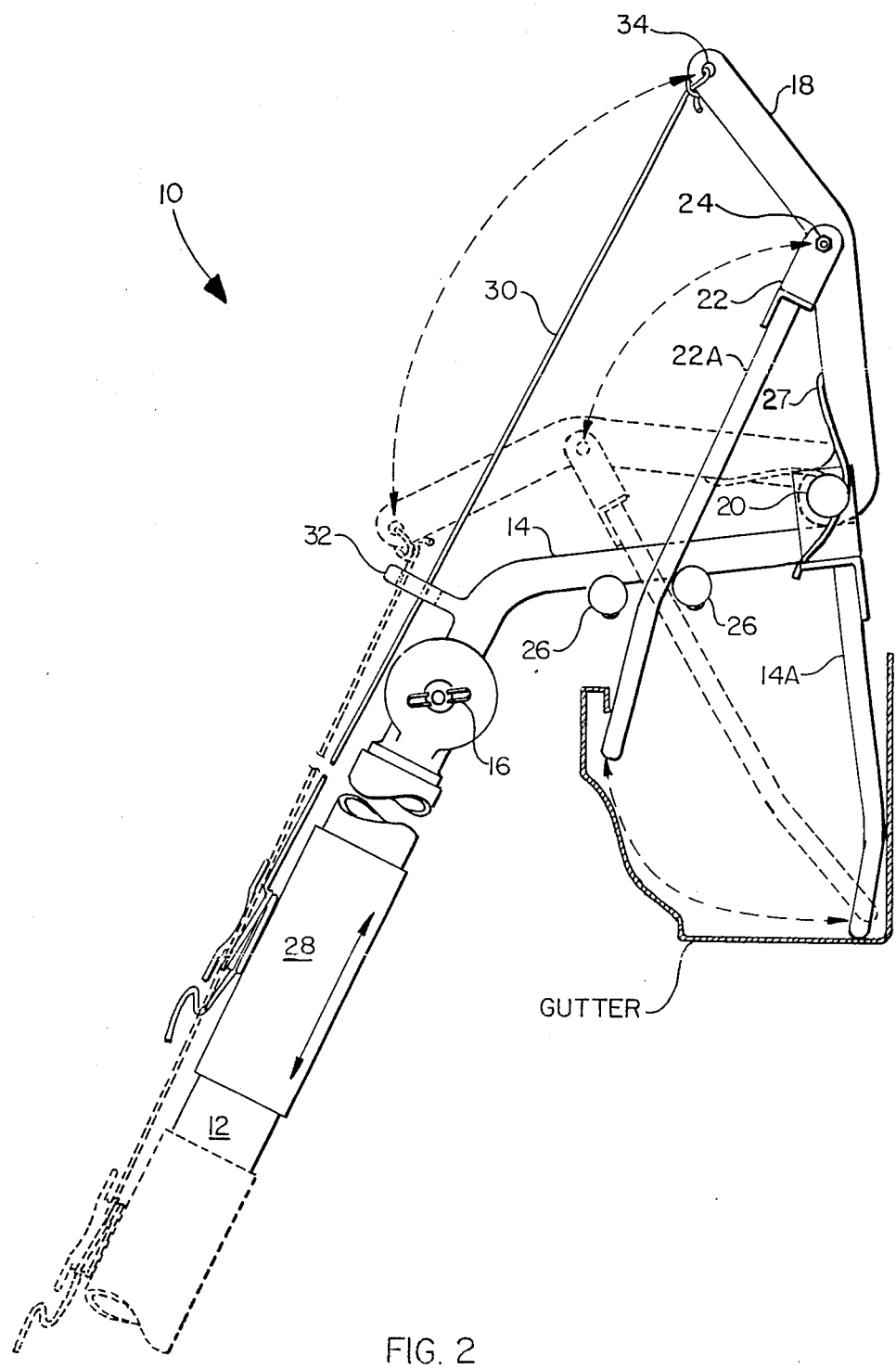
FIG. 2 is a side elevational view of the gutter cleaner of the present invention positioned in a gutter with the jaws in open position and wherein the jaws closed position is indicated in phantom lines.
Figure 3:
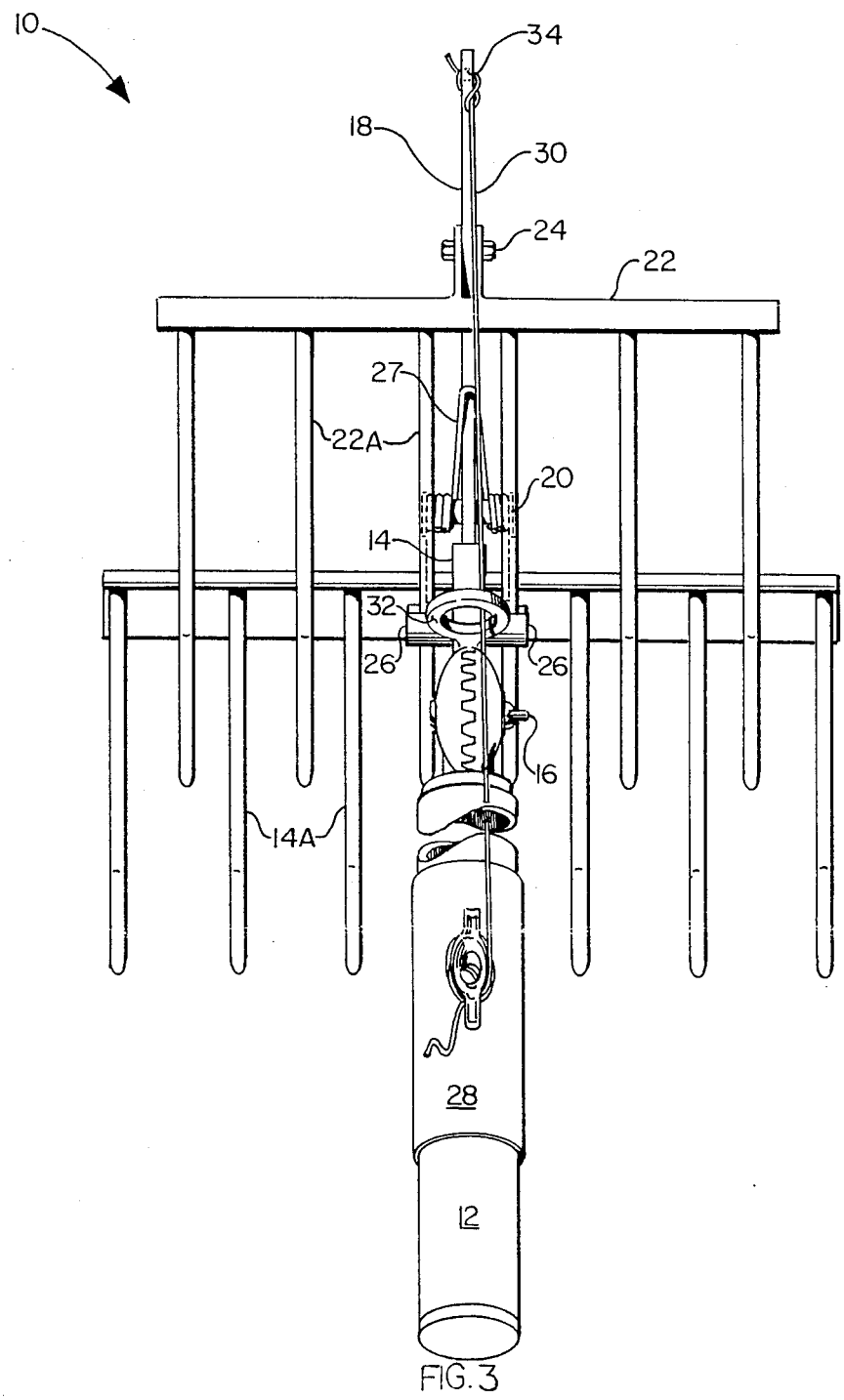
FIG. 3 is a rear elevational view of the gutter cleaner of the present invention.

Referring more specifically to the drawings, a preferred embodiment of a gutter cleaner which incorporates the features of the present invention is illustrated in FIGS. 1–3 and generally designated 10. The gutter cleaner comprises an elongate handle 12 that is adapted to be held and guided by an individual user standing on the ground below a home or building gutter to be cleaned. Telescopic handle 12 most suitably extends from an initial length of about 5 to 7 feet to a fully extended length of about 25 to 30 feet and may include any suitable number of telescopic sections. In its fully extended length, it is contemplated that gutter cleaner 10 may be used to clean a third floor gutter while standing at ground level.

Telescopic handle 12 has stationary jaw 14 secured to the top thereof with adjustment screw 16 which allows for selective securement of stationary jaw 14 at a desired angle relative to handle 12 with parallel fingers 14A extending generally downwardly toward the lower end of handle 12. Thus, the angle of jaw 14 relative to handle 12 can be changed as needed as gutter cleaner 10 is moved from gutters on one floor to the gutters on a different floor of a home or building.

Link arm 18 is pivotably mounted at one end to stationary jaw 14 with a suitable bolt and washer 20. Relatively pivotably movable jaw 22 is pivotably mounted at its upper end to the medial portion of link arm 18 with a suitable bolt and washer 24. Jaw 22 comprises a plurality of parallel fingers 22A which, like those of stationary jaw 14, extend perpendicularly to the lengthwise direction of the jaw and generally downwardly toward the lower end of handle 12. A pair of guide elements 26 are positioned in spaced-apart relationship on each side of the elongate support neck of stationary jaw 14, and two adjacent medial fingers of pivotably movable jaw 22 are positioned so that each finger slides between a respective pair of guide elements 26 on the support neck of jaw 14 in order to guide the movement of jaw 22 when link arm 18 is pivoted downwardly toward the lower end of handle 12 in order to close the jaws of gutter cleaner 10.

At this point it should be particularly emphasized that fork-like jaws 14 and 22 each has a greater width than height as can be best appreciated with reference to FIGS. 1 and 3. Although it is contemplated that the jaws may be constructed in a variety of sizes, it is believed that a preferred embodiment of the jaws provides for each jaw having a length of at least about 9 to 12 inches in the horizontal direction with fingers 14A and 22A extending for a length of at least about 3 to 4 inches and 6 to 8 inches, respectively. In this fashion, use of gutter cleaner 10 would consist of placing jaw 14 in contact with the backside of a gutter and oriented so that jaw 14 is extending parallel to the longitudinal axis of the gutter. When gutter cleaner 10 is so positioned, jaw 22 will also be positioned in the gutter and extend parallel to and substantially coextensive with jaw 14. When it is desired to close the jaws in order to entrap and remove gutter debris, jaw 22 will be urged to move in a scooping-type arc (which will be described later in greater detail) towards jaw 14 in a pathway direction which is substantially perpendicular to the longitudinal axis of the gutter. The relatively great width of the jaws of gutter cleaner 10 results in the ability to remove debris from a relatively great length of gutter with each use thereof by an individual. Also, the front-to-back movement of fork-like jaw 22 relative to jaw 14 allows the gutter cleaner to straddle gutter support cross members as well as to effectively clean over downspouts at the gutter ends which is not possible with previous gutter cleaners using a side-to-side type movement.

Jaws 14 and 22 are normally urged open by spring 27 which is connected at one end to jaw 14 and at the other end to link arm 18 so as to urge both link arm 18 and pivotably mounted jaw 22 generally upwardly to provide an open space between the ends of the jaws. Link arm 18 is actuated by a circumferential sleeve 28 which is slidably mounted on the user end of handle 12 with a rope 30 secured thereto at one end thereof and extending upwardly (through guide eye 32 located at the base of jaw 14) to aperture 34 defined by the outer end of link arm 18 where the other end of rope 30 is secured. In this fashion, an individual user of gutter cleaner 10 merely slides sleeve 28 downwardly along handle 12 in order to urge jaws 14 and 22 into closed relationship and thereby to engage debris within a gutter. When gutter cleaner 10 has been removed from the gutter to deposit the debris at a desired location, the user then slides sleeve 28 upwardly along handle 12 so as to allow jaws 14 and 22 to be urged open by spring 27. Applicant believes this feature to be particularly important since, unlike prior art gutter cleaner devices presently known to applicant, it allows the individual user to maintain both hands on the handle for complete control and ease of use as the jaws of the gutter cleaner are opened and closed by the user positioned at ground level. As noted hereinbefore, most prior gutter cleaning apparatus require that one hand be used to pull or actuate a cord which then actuates gutter cleaning elements at the top of the handle and thus only the remaining hand is available in order to hold and manipulate the gutter cleaner. Although applicant's sleeve is a preferred means for actuation of the jaws of gutter cleaner 10, applicant does contemplate that other actuation means could possibly be utilized, including an electrical switch positioned at the lower end of the handle to actuate a motor mounted at the top of the handle and operatively connected to lower jaw 22, which could also provide for ease of manipulation of jaws 14 and 22.

Finally, applicant also wishes to describe the unique scoop-type movement provided by applicant's gutter cleaner 10 and which can best be appreciated with reference to FIG. 2 of the drawings. As can be seen, lower jaw 22 in closing pivots about two pivot points, bolt and washer assemblies 20 and 24, as slide 28 is urged downwardly on handle 12. As jaw 22 travels downwardly, its pathway is defined by two pairs of guide elements 26 so that the jaw essentially moves downwardly and inwardly towards stationary jaw 14 (see phantom lines in FIG. 2). This unique movement is particularly advantageous for efficiently cleaning gutters. As described hereinbefore, stationary jaw 14 is placed adjacent the back wall of a gutter and jaw 22 thus cleans the gutter pathway between the two jaws by moving downwardly adjacent the front gutter wall and generally inwardly along the gutter bottom towards stationary jaw 14 thereby following the gutter profile and entrapping all leaves and other debris which may be disposed along the length of the gutter coextensive with the length of the jaws.

In operation, the individual user lowers the jaws of gutter cleaner 10 into an overhead gutter in the manner described above with stationary jaw 14 adjacent the back wall of the gutter. He then pulls downwardly on sleeve 28 causing link arm 18 and pivotably mounted jaw 22 to move downwardly against the resilient urging of spring 27. The travel pathway of jaw 22 is defined by the two medial fingers 22A thereof which each travel between a respective pair of guide elements 26 as the jaw moves downwardly and laterally toward stationary jaw 14 at the back of the gutter. The closed jaws are then lifted from the gutter and reopened (by moving sleeve 28 upwardly) at a position removed from the gutter so that the enclosed debris may fall to the ground or be placed onto a trash pile on the ground. Gutter cleaner 10 is then again positioned in the gutter in a position adjacent the length of gutter which has been newly cleaned. The relatively great width of the jaws permits the individual user to collect a large quantity of gutter debris with each "bite" or placement thereof in the gutter, and sleeve 28 allows for ease of use of gutter cleaner 10 since both hands may be retained on handle 12 during use thereof.

In the drawings and specification, there has been set forth a preferred embodiment of the invention, and although specific terms are employed, they are used in a generic and description sense only and not for the purposes of limitation.

What is claimed is:

1. An apparatus for remotely removing accumulated leaves and other debris from an overhead gutter of a building or the like, and comprising:

an elongate handle having one end adapted to be held by a user and a remote end adapted to reach adjacent a gutter;

a pair of co-operating fork-like jaws mounted to the remote end of said handle wherein each of said jaws has a greater width than height, said jaws comprising a stationary first jaw adapted to be positioned in an overhead gutter parallel to the longitudinal axis of the gutter, and a relatively pivotably movable second jaw extending lengthwise parallel to and substantially coextensive with said first jaw, said second jaw being adapted to move toward and away from said first jaw into closed and open positions, respectively, and said first jaw being adjustably mounted to the top of said handle to permit pivotal adjustment of the angle of said first jaw relative to said handle so as to facilitate use of said apparatus in gutters of varying height;

means for biasing said pair of fork-like jaws outwardly relative to each other into their open position; and actuation means operable from said user end of said elongate handle for selectively moving said fork-like jaws into their open and closed positions;

whereby a user may position said pair of jaws lengthwise in an overhead gutter with said jaws in an open position and actuate them so as to move them together to a closed position to collect gutter debris therebetween for removal from the gutter.

2. An apparatus according to claim 1 wherein said jaws each comprise a plurality of parallel fingers which extend perpendicularly to the lengthwise direction of said jaw and generally downwardly toward the user end of said handle.

3. An apparatus according to claim 1 wherein said biasing means comprises a spring operatively associated with both said stationary first jaw and said pivotably movable second jaw.

4. An apparatus according to claim 1 wherein said actuation means comprises a sleeve slidably mounted on the user end of said handle and a cord secured at one end to said sleeve and operatively associated with said pivotably movable second jaw at the other end.

5. An apparatus for remotely removing accumulated leaves and other debris form an overhead gutter of a building or the like, and comprising:

an elongate handle having one end adapted to be held by a user and a remote end adapted to reach adjacent a gutter;

a pair of co-operating fork-like jaws mounted to the remote end of said handle wherein each of said jaws has a greater width than height, said jaws comprising a stationary first jaw adapted to be positioned in an overhead gutter parallel to the longitudinal axis of the gutter, and a relatively pivotably movable second jaw extending lengthwise parallel to and substantially coextensive with said first jaw, said second jaw being adapted to move toward and away from said first jaw into closed and open positions, respectively, and said first jaw being adjustably mounted to the top of said handle to permit pivotal adjustment of the angle of said first jaw relative to said handle so as to facilitate use of said apparatus in gutters of varying height;

spring means for biasing said pair of fork-like jaws outwardly relative to each other into their open position; and a sleeve slidably mounted on the user end of said handle and a cord secured at one end to said sleeve and operatively associated with said pivotably movable second jaw at the other end for selectively moving said fork-like jaws into their open and closed positions;

whereby a user may position said pair of jaws lengthwise in an overhead gutter with said jaws in an open position and actuate them so as to move them together to a closed position to collect gutter debris therebetween for removal from the gutter.

6. An apparatus according to claim 5 wherein said jaws each comprise a plurality of parallel fingers which extend perpendicularly to the lengthwise direction of said jaw and generally downwardly toward the user end of said handle.

7. An apparatus for remotely removing accumulated leaves and other debris from an overhead gutter of a building or the like, and comprising:

an elongate handle having one end adapted to be held by a user and a remote end adapted to reach adjacent a gutter;

a pair of co-operating fork-like jaws mounted to the remote end of said handle wherein each of said jaws has a greater width than height, said jaws comprising a stationary first jaw adapted to be positioned in an overhead gutter parallel to the longitudinal axis of the gutter, and a relatively pivotably movable second jaw extending lengthwise parallel to and substantially coextensive with said first jaw, said second jaw being adapted to move toward and away from said first jaw into closed and open positions, respectively, and wherein said stationary first jaw is fixedly secured to said handle and said relatively pivotably movable second jaw is operatively associated with said first jaw by a link arm which is pivotably connected at one end to the back of said stationary first jaw and wherein said second jaw is pivotably connected to said link arm at a second and spaced-apart position along the length thereof so that said second jaw travels through a scooping-type arc about the two pivotal connections as it moves toward and away from said stationary first jaw;

means for biasing said pair of fork-like jaws outwardly relative to each other into their open position; and actuation means operable from said user end of said elongate handle for selectively moving said fork-like jaws into their open and closed positions;

whereby a user may position said pair of jaws lengthwise in an overhead gutter with said jaws in an open position and actuate them so as to move them together to a closed position to collect gutter debris therebetween for removal from the gutter.

8. An apparatus for remotely removing accumulated leaves and other debris form an overhead gutter of a building or the like, and comprising:

an elongate handle having one end adapted to be held by a user and a remote end adapted to reach adjacent a gutter;

a pair of co-operating fork-like jaws mounted to the remote end of said handle wherein each of said jaws has a greater width than height, said jaws comprising a stationary first jaw adapted to be positioned in an overhead gutter parallel to the longitudinal axis of the gutter, and a relatively pivotably movable second jaw extending lengthwise parallel to and substantially coextensive with said first jaw, said second jaw being adapted to move toward and away from said first jaw into closed and open positions, respectively, and wherein said stationary first jaw is fixedly secured to said handle and said relatively pivotably movable second jaw is operatively associated with said first jaw by a link arm which is pivotably connected at one end to the back of said stationary first jaw and wherein said second jaw is pivotably connected to said link arm at a second and spaced-apart position along the length thereof so that said second jaw travels through a scooping-type arc about the two pivotal connections as it moves toward and away from said stationary first jaw;

spring means for biasing said pair of fork-like jaws outwardly relative to each other into their open position; and a sleeve slidably mounted on the user end of said handle and a cord secured at one end to said sleeve and operatively associated with said pivotably movable second jaw at the other end for selectively moving said fork-like jaws into their open and closed positions;

whereby a user may position said pair of jaws lengthwise in an overhead gutter with said jaws in an open position and actuate them so as to move them together to a closed position to collect gutter debris therebetween for removal from the gutter.

* * * * *